United States Patent [19]

Stanley et al.

[11] Patent Number: 5,522,562

[45] Date of Patent: *Jun. 4, 1996

[54] TAPE CARTRIDGE AND METHOD OF MAKING THE SAME

[75] Inventors: Donald Stanley; Kenneth Sheppard; Leif Skaar, all of San Diego, Calif.

[73] Assignee: Verbatim Corporation, Charlotte, N.C.

[ * ] Notice: The term of this patent shall not extend beyond the expiraiton date of Pat. No. 5,333,806.

[21] Appl. No.: 149,301

[22] Filed: Nov. 9, 1993

Related U.S. Application Data

[63] Continuation-in-part of Ser. No. 892,762, Jun. 3, 1992, Pat. No. 5,333,806.

[51] Int. Cl.⁶ .................................................. G11B 23/087
[52] U.S. Cl. ........................ 242/342; 242/344; 242/345; 242/346; 242/347
[58] Field of Search ................................. 242/341, 344, 242/347, 346, 345, 345.2, 342; 360/74.6, 132; 226/196

[56] References Cited

U.S. PATENT DOCUMENTS

| | | | |
|---|---|---|---|
| 3,537,779 | 11/1970 | Horvath | 242/344 |
| 3,615,155 | 10/1971 | Gelbman . | |
| 3,861,619 | 1/1975 | Wolff | 360/72 |
| 4,032,987 | 6/1977 | Singer et al. | 360/132 |
| 4,219,169 | 8/1980 | Majicek | 242/352.4 |
| 4,371,131 | 2/1983 | Okamura et al. . | |
| 4,380,032 | 4/1983 | Pfost | 360/74.6 |
| 4,457,473 | 7/1984 | Mroz et al. . | |
| 4,570,197 | 2/1986 | Hakanson et al. | 360/132 |
| 4,631,618 | 12/1986 | Ozawa et al. | 360/132 |
| 4,635,155 | 1/1987 | Georgens et al. | 360/132 |
| 4,642,721 | 2/1987 | Georgens et al. | 360/132 |
| 4,674,703 | 6/1987 | Falk | 360/132 |
| 4,763,217 | 8/1988 | Oishi | 360/132 |
| 4,783,022 | 11/1988 | Onmori et al. . | |
| 4,862,305 | 8/1989 | Katagiri et al. | 360/132 |
| 5,034,839 | 7/1991 | Okamura et al. | 360/132 |
| 5,121,275 | 6/1992 | Komiyama | 360/132 |

FOREIGN PATENT DOCUMENTS

| | | |
|---|---|---|
| 61-145747 | 7/1986 | Japan . |
| 4-53078 | 2/1992 | Japan . |
| 4-216383 | 8/1992 | Japan . |

*Primary Examiner*—John P. Darling
*Attorney, Agent, or Firm*—Albert C. Smith

[57] ABSTRACT

A data tape cartridge is formed on a baseplate of polymeric material which supports mounting pins and tape guides thereon for supporting tape components in rigid and dimensionally-stable manner using integrally formed bosses to support the mounting pins and guides. Additional stability against flexure is achieved using a matrix pattern of integrally-formed webs or ribs and sidewalls in the baseplate and by attaching a top plate substantially about the entire perimeter of the sidewalls. Lateral forces exerted against rotatable components on the mounting pins are transferred to the baseplate and top plate by the mounting pins that are supported in both plates. A midguide support is integrally formed in the baseplate to support a guide pin at critical location adjacent the location along the tape path in the cartridge at which a tape transducer interacts with tape. Methods of assembly include inserting mounting pins into the baseplate while the material of the baseplate about the mounting pins is plasticized, and also include assembling the components of the cartridge in upside-down orientation for transfer to aligned pins and pegs in the baseplate.

9 Claims, 14 Drawing Sheets

TAPE CARTRIDGE AND METHOD OF MAKING THE SAME

RELATED APPLICATIONS

This application is a continuation-in-part application of pending application Serial No. 07/892,762, now U.S. Pat. No. 5,333,806, entitled "Tape Cartridge and Method of Making the Same", filed on Jun. 3, 1992, from which pending application Ser. Nos. 08/039,870, now abandoned and 08/039,879, now U.S. Pat. No. 5,322,585 entitled "Tape Cartridge and Method of Making Same" were filed on March 30, 1993 as divisional applications, and the subject matter hereof is related to the subject matter disclosed in pending application Ser. No. 08/018,731, now abandoned entitled "System for Improving Instantaneous Speed Variations in Magnetic Tape Equipment", filed on Feb. 17, 1993, and to the subject matter disclosed in pending application Ser. No. 08/021,061, now abandoned entitled "Integrated Light Reflecting Structure for Use in Magnetic Tape Cartridge", filed on Feb. 2, 1993.

FIELD OF THE INVENTION

This invention relates to magnetic tape cartridges, and more particularly to the structure and method of making low-cost, precision tape cartridges.

BACKGROUND OF THE INVENTION

Reel-to-reel magnetic tapes and one-half inch and one-quarter inch magnetic tape data cartridges are commonly used for the storage of electronic data signals. A typical tape data cartridge comprises a metal baseplate with pins extending upwardly from the plate to support corner rollers, reel hubs, a drive roller, and posts which extend upwardly to support tape guides. Typically, the wails and top of the cartridge are made of polymeric material and the top usually includes a spring to limit the vertical movement of the reel hubs. The tape alignment must be precise for the recording or the retrieving of the desired data signals on the tape. Therefore, it is very important that the pins and posts maintain their alignment during cartridge use. This is in clear distinction to tape cassettes which merely house a length of tape on hubs that require external support for movement of tape over a tape path that is determined by external tape guides. Tape cartridges therefore are essentially self-contained machines which require precision placement and elevational orientation of internal tape guides and internal supporting pins for rotatable components.

With the metal baseplate currently used, the pins are rigidly secured to the metal baseplate and the metal baseplate provides sufficient rigidity to support the various components received on the pins such that the tape does not become misaligned or dislodged during use. However, the metal baseplate is a major contributing expense to the overall cost of the cartridge. The use of a polymeric material for the baseplate typically does not achieve the equivalent structural strength required for successful use of the cartridge. If such polymeric material is too hard, inserting the pins into the material presents an additional problem of stress and fatigue cracks commonly occurring where the pins are inserted. Conversely, too soft a polymeric material imparts an elasticity to the pins received in the material which results in misalignment of the tape and associated components in use.

SUMMARY OF THE INVENTION

In accordance with the present invention a cartridge is formed of polymeric material to include a baseplate which imparts to the pins received therein a functional rigidity at least equivalent to that of a metal baseplate. The polymeric baseplate includes integral side walls of the same material that is compatible with the material of the top plate of the cartridge for ultrasonic welding or gluing together and for closely matching thermal coefficients of expansion. The polymeric baseplate also includes an integrally-formed midguide member to ensure precise alignment of the tape as it passes a read/write head, and also includes a plurality of ribs or webs in a matrix pattern to enhance planar stiffness and torsional rigidity of the assembled cartridge. In the method of assembly according to the present invention, pins for rotatably supporting tape hubs and belt rollers are inserted into the polymeric baseplate without attendant stress cracks or fissures, with the upper ends of one or more of the pins disposed to be supported in a top plate. The entire structure is rigidly assembled to provide accurate alignment of critical tape components. A write-protect device is attached to the assembled tape cartridge for snap-off or slide write protection of data signals on the tape within the assembled cartridge. A tape-loading process facilitates assembling pre-loaded hubs of tape onto the baseplate with tape and drive belt and associated components in proper registration on pins and tape guides on the baseplate.

Specifically, the present invention embodies a polymeric cartridge having a baseplate formed of fiberglass-filled polycarbonate material with metal pins received in bosses that are integrally formed on an inner surface of the baseplate. Side walls are integrally formed on the baseplate of the same material as the baseplate to enhance rigidity of the baseplate against flexure and torsional distortions. The top plate of the cartridge is formed preferably of polycarbonate material with apertures therein positioned to receive and rigidly support the upper ends of one or more of the pins, and the assembled cartridge imparts to the pins a stability which is similar to the stability of pins secured in prior-art metal baseplates. The baseplate additionally includes a rib-like midguide support and a midguide pin secured therein to insure proper alignment of the tape as it passes a read/write head. The top plate is rigidly secured to the side walls of the baseplate by ultrasonic welding or adhesive, and may carry elastomeric springs or metal leaf springs which are secured to the underside of the cover to limit the axial play of the tape hubs that are rotatably mounted on a pair of support pins.

In the method of manufacturing the cartridge according to the present invention, a plurality of pins are secured in a fixture and a baseplate having apertured bosses is spaced from the pins in alignment with the apertures in the bosses. The baseplate is then relatively moved into contact with the pins and the material of the baseplate is effectively plasticized at the locations of contact with the pins from an initial set state to a second or plastic state by application of ultrasonic energy or heat, or both, to the pins or baseplate. The pins are simultaneously forced into internal apertures in the bosses, carrying at least some of the plasticized material of the aperture wall ahead of the leading ends of the pins. After the pins have been inserted a predetermined distance the ultrasonic energy or heat is removed and the material of the baseplate returns to its initial set state, rigidly securing the pins in the bosses. The material which was displaced ahead of the leading end of the pins sets within the aperture to form a floor for the pins and the walls of the aperture, thereby sealing the apertures and further rigidly supporting the pins in the baseplate. After hubs containing a coiled length of tape, and the tape guides, and the drive belt and associated rollers are all assembled on the baseplate, a top plate, having an aperture or apertures therein that are aligned to receive and rigidly support the upper ends of one or more of the pins, is urged into position on the pins and is securely fastened to the sidewalls of the baseplate substantially entirely about the periphery of the top plate.

DESCRIPTION OF THE PREFERRED EMBODIMENT

Figure 1A:
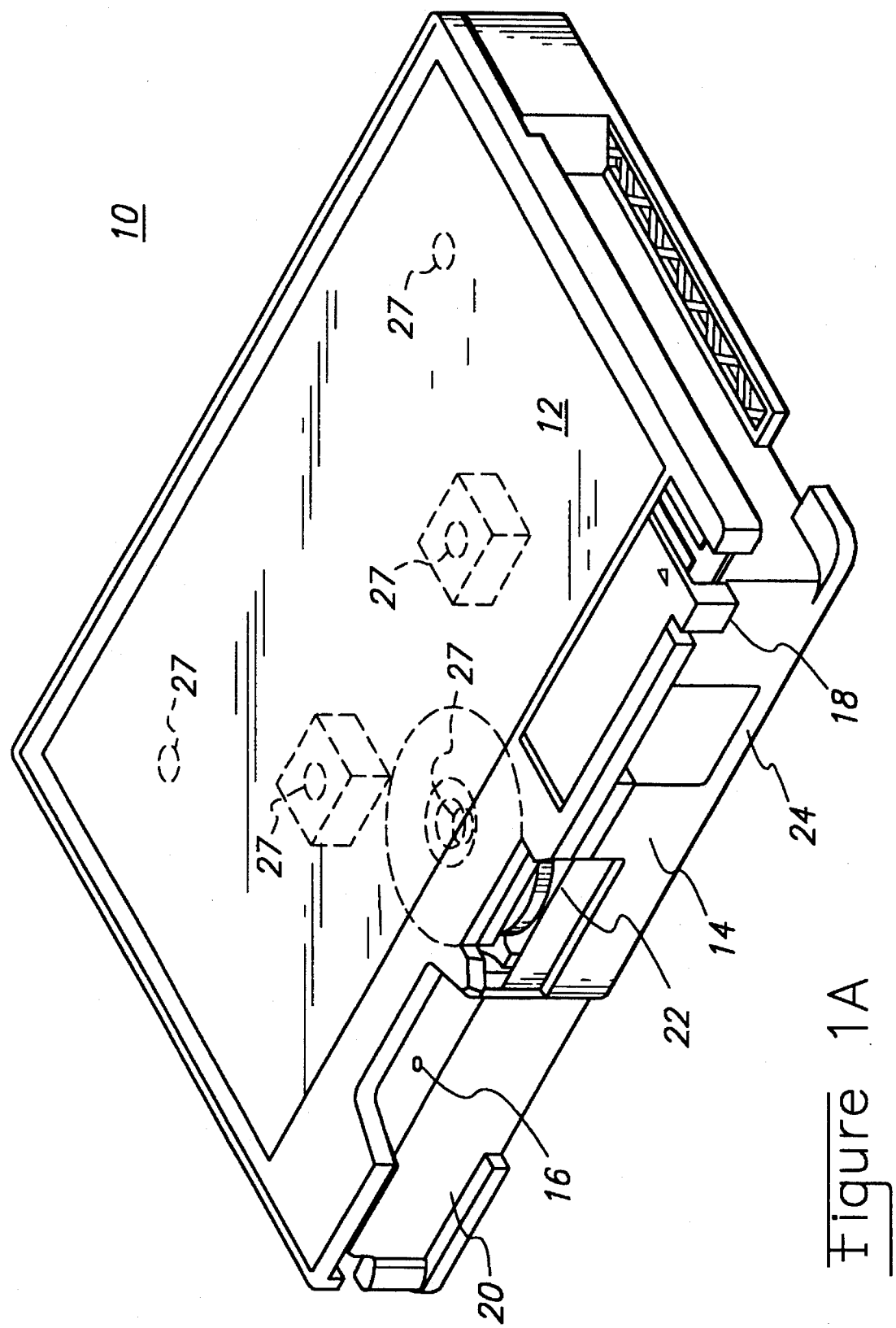
FIG. 1(a) is a perspective view of an assembled tape data cartridge.

Referring now to FIG. 1(a), there is shown a perspective view of a tape data cartridge 10 that includes a top plate 12, a front wall 14 including a recess 16 (in which a read/write head, not shown, is received), a write protect device 18, a conventional pivoted door 20 over the recess 16, a drive roller 22, and an optical window 24 for passing optical signals that identify the end of tape and bottom of tape. Tape data cartridges of this type are standardized in dimensions and orientation of components according to proposed American National Standards Institute (ANSI) Standard No. X3B5/90-218a. Tape data cartridges of this type are operated via a single drive roller 22 that is coupled to an internal drive belt which traverses the perimeter of each reel of tape and passes over a pair of guide rollers positioned near the remote rear corners of the cartridge, as described, for example, in the aforementioned ANSI Standard. In addition, the door 20 is pivoted near the forward left-side corner to swing open in outward direction from the recess 16 to expose the recording tape to a read/write tape transducer that may be positioned in the recess to contact tape in the cartridge. Additionally, the optical window 24 passes optical signals therethrough which passed through apertures in the tape, as described for example in the aforementioned ANSI Standard. Finally, a removable or slidable write-protect device 18 is snap-fitted into a recess in the top plate 12 of the cartridge to engage a transducer suitably positioned in a receiving tape drive mechanism to inhibit recording or writing onto the tape contained within the cartridge 10 when the device 18 is not present on the cartridge.

Figure 1B:
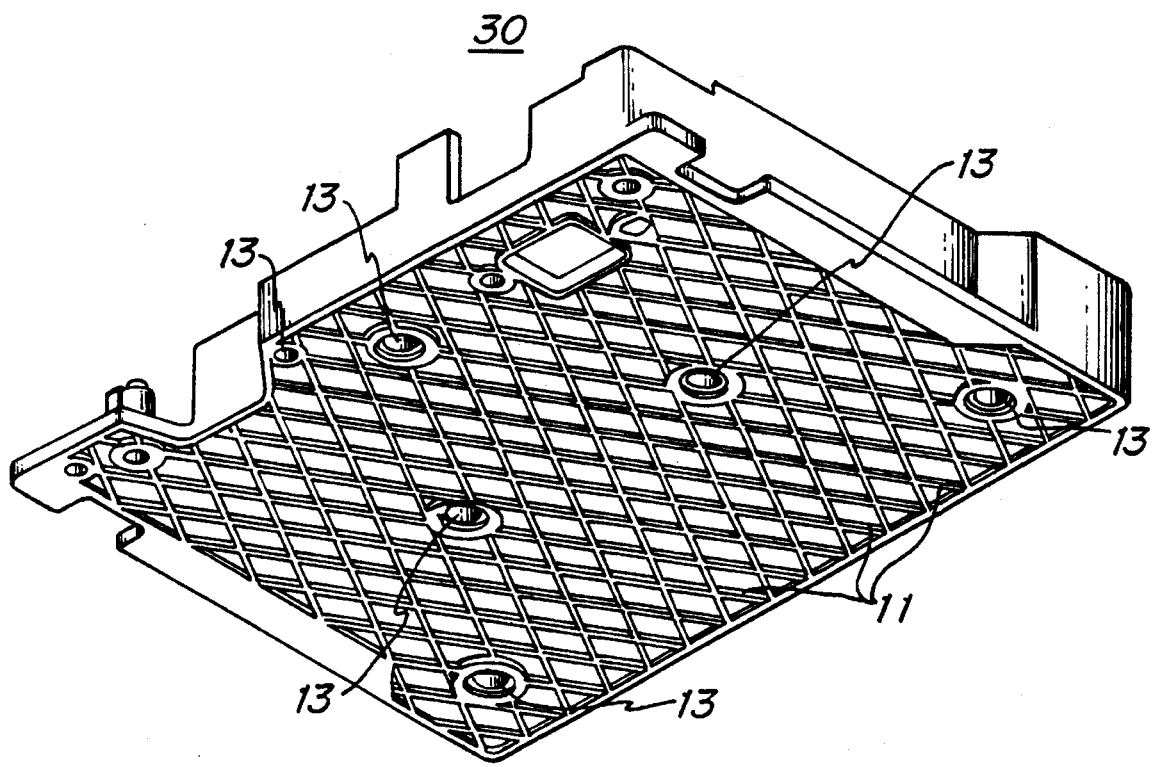
FIG. 1 (b) is a perspective bottom view of a baseplate for a tape data cartridge embodying the invention.

Referring now to FIG. 1(b), there is shown a perspective bottom view of the baseplate 30 showing the integral front and sidewalls and showing the matrix pattern of ribs or webs 11 traversing the plane of the bottom of the baseplate 30, and also showing the apertured 13 undersides of the bosses that support pins and guides. The baseplate 30 with integral walls and associated pin bosses and ribs or webs 11 may all be formed in a common mold in conventional manner using a composition such as polycarbonate plastic filled with about 20% by volume of glass fibers to yield a material that exhibits a flexural modulus of elasticity on the order of about 750,000. Optionally, conductive material such as carbon or other metallic particles may be included throughout the composition to provide electrostatic and electromagnetic shielding as well as enhanced thermal conductivity. Alternately, the baseplate 30 may be plated with metal or coated with conductive paint or ink to provide electrostatic shielding. The baseplate 30 thus configured, when assembled with a top plate 12 as later described herein, obviates the need for traditional fabrication of a baseplate from aluminum having a flexural modulus of elasticity on the order of about 10 million in order to provide the requisite rigidity in a data tape cartridge needed to comply with the ANSI Standard cited above. The baseplate 30 of the present invention thus uses lighter, more flexible, and less expensive materials and distinctive constructional features to provide a data tape cartridge that fully satisfies the requirements of the ANSI Standard, including the reference surfaces involved for properly positioning a data tape cartridge within a tape drive unit. The lower surface of the baseplate 30 including the lower-most edges of the webs 11 form a reference plane or datum with respect to which the elevation of other elements including a width of tape and the drive roller 47 of FIG. 2 must be accurately positioned. In addition, side edges 31 along at least one side of the baseplate 30 provide a reference edge for proper lateral positioning of the assembling within a tape drive unit.

Figure 2:
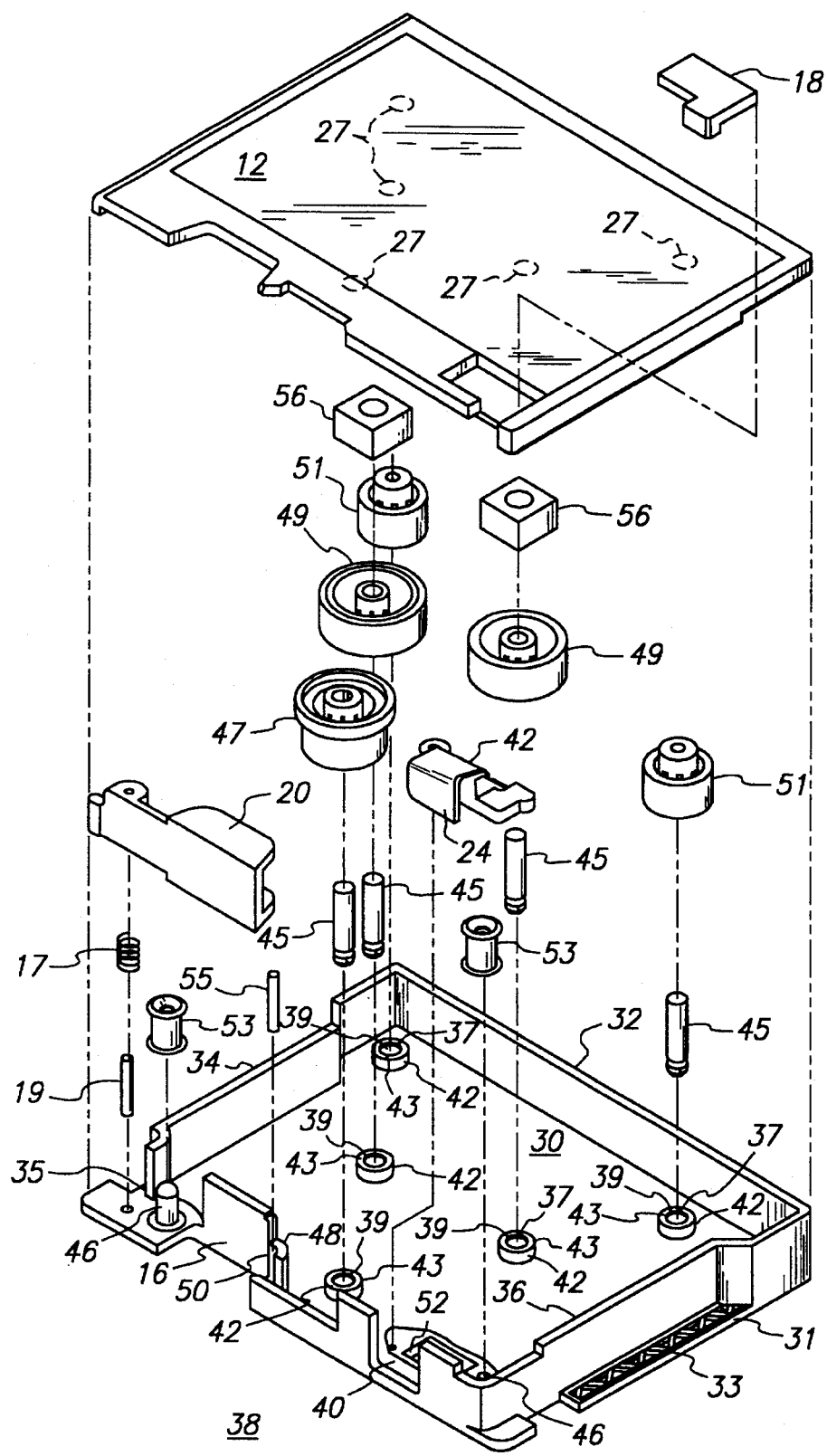
FIG. 2 is an exploded perspective view of the tape data cartridge of FIG. 1(a)

Referring now to FIG. 2, there is shown a perspective exploded view of a tape data cartridge showing the internal components of the cartridge (less tape and drive belt) according to the present invention. Specifically, the baseplate 30 includes integrally-formed rear and side walls 32, 34, 36 and a front wall 38 having a plurality of openings therein, as later described herein. At least five raised, pin-receiving bosses 43 are also integrally-formed in the baseplate 30 to receive and rigidly support pins 45 that serve as axles for the drive roller 47, the tape hubs 49, and the drive-belt rollers 51. In addition, the baseplate 30 includes integrally-formed support pegs 46 and associated bosses for tape-guides 53 and optionally a midguide support rib 50 for retaining tape-guiding pin 55 in proper orientation adjacent the recess 16. The integral bosses for the pins 45 and pegs 46 all have upper reference surfaces that are disposed at precise elevations relative to the datum or reference plane of the baseplate 30. The door 20 is pivoted about pin 19 and is spring biased 17 to normally closed position over the recess 16. An optical prism 42 formed, for example, of clear polycarbonate or acrylic plastic material includes a reflecting surface such as a mirror oriented at about a 45° angle to the bottom or datum of the baseplate 30. This prism 42 supports window 24 and is mounted in the aperture 52 in the baseplate 30 and in alignment with aperture 40 in the front wall 38 for passing optical signals through a tape that is oriented to pass along a path between tape guide 53 inside the front wall 38 and past the aperture 40, as later described herein. Elastomeric elements including a foam layer and an underside slippery layer such as ultrahigh molecular weight polyethylene or polypropylene 56 may be adhered to the top plate 12 in registration over the axes of the tape hubs 49 to limit the end-play movement of the tape hubs 49 on their respective support pins 45. Alternatively, metal leaf springs may be attached to the top plate 12 or may be supported on the baseplate 30 with ends in registration over the axes of the tape hubs 49 to limit the end-play movement of the tape hubs 49 on their respective support pins 45. The top plate 12 may be formed of polycarbonate material closely matching the thermal coefficient of expansion of the baseplate material, and may be ultrasonically welded or adhesively attached about its perimeter to the top edges of the walls 32, 34, 36 and 38 to form a rigid structure housing the components in precise orientation. One or more apertures 27 in the top plate are aligned to receive and rigidly support therein the upper ends of one or more corresponding pins 45. Of course, the aperture or apertures 27 need not pass through the top plate, but may be formed as a 'blind' hole or recess in the underside of the top plate 12.

Figure 3:
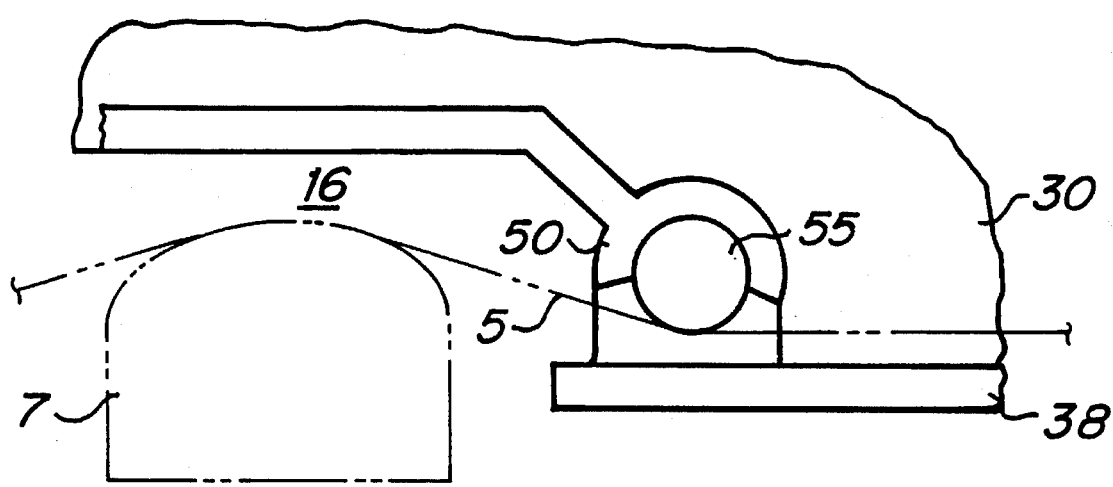
FIG. 3 is a top view of the midguide portion of the baseplate according to FIG. 2.

Referring now to FIG. 3, there is shown a cutaway view of the midguide portion of the baseplate 30 showing the integral midguide support rib 50 retaining a tape-guide pin 55 in proper vertical orientation relative to the baseplate 30 for correctly guiding a tape 5 over a read/write tape transducer 7 that may be positioned within the recess 16 in the front wall 38. This support rib 50 is disposed around greater than half the circumference of pin 55 to assure retention of the pin 55 over its length in rigid vertical orientation relative to the baseplate 30.

Figure 5:
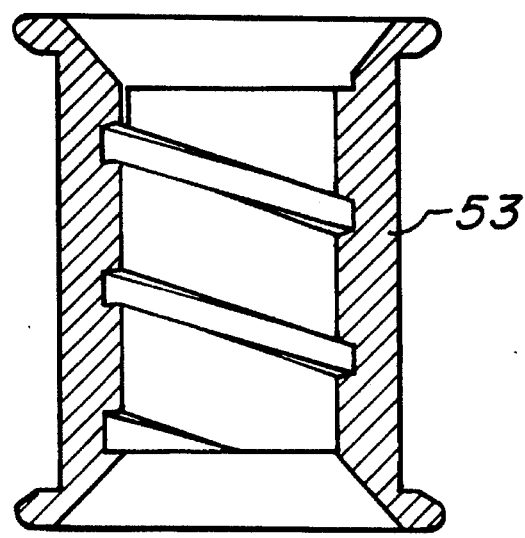
FIG. 5 is a front sectional view of an alternative embodiment of a tape guide.
Figure 4:
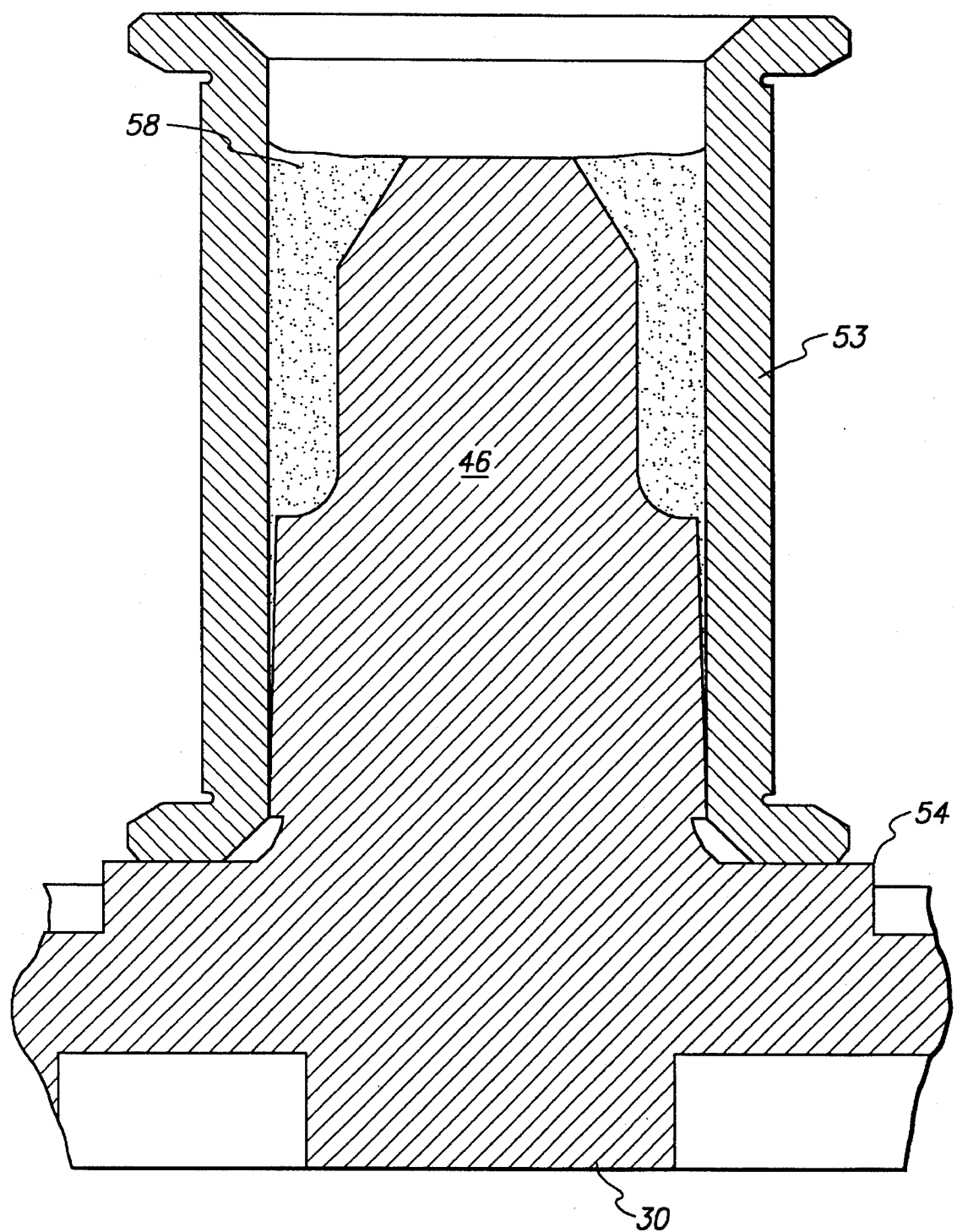
FIG. 4 is a front sectional view of a tape guide assembled on a baseplate according to FIG. 2.

Referring now to FIG. 4, there is shown a sectional view of a tape guide 53 mounted on an integral support peg 46 in rigid orientation relative to the baseplate 30. Specifically, the raised boss 54 and the support peg 46 are integrally formed on the baseplate 30 to orient the tubular tape guide 53 at the proper vertical elevation and perpendicular orientation relative to the baseplate 30. The tape guide 53 includes identical radially outward-extending shoulders spaced apart at the ends of the tape guide 53 by the width of tape in order to facilitate automated placement on a mounting peg 46 in either end-for-end orientation. An adhesive 58, for example, that is curable under ultraviolet radiation (such as LOCTITE 376, commercially available from LOCTITE CORP.) retains the tape guide 53 in fixed position without rotational or translational movement on support peg 46 and raised boss 54. Alternatively, as illustrated in the sectional view of FIG. 5, the tape guide 53 may include internal grooves such as in the shape of a helix or a rough internal surface in order to facilitate attachment and ample adhesion of the tubular tape guide 53 to the support peg 46. These tape guides may be formed of stainless steel, nickel-silver, or similar material and smoothly polished to provide controlled frictional engagement with tape, for example, in the manner as described in the aforementioned Related Applications.

Figure 6:
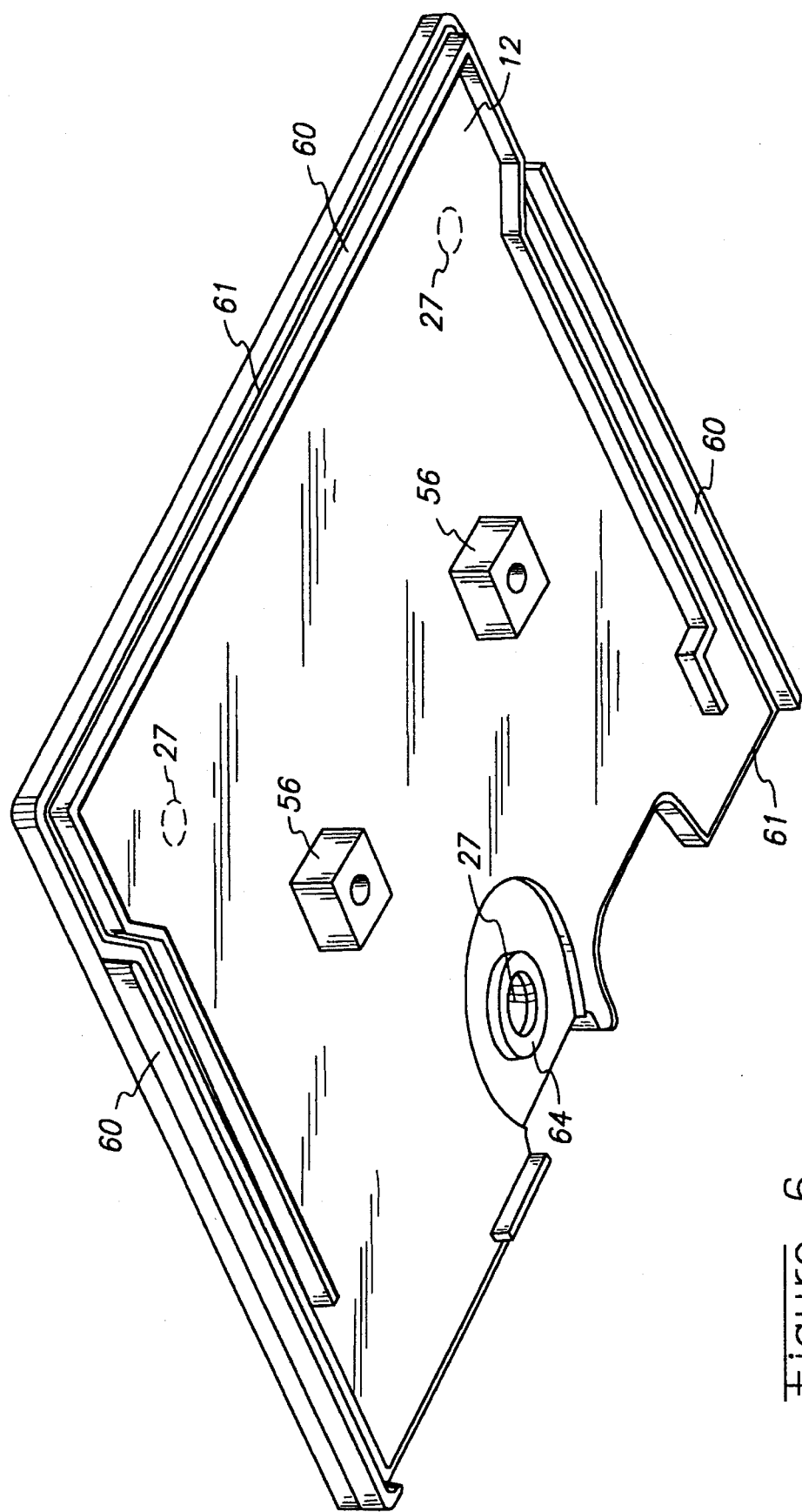
FIG. 6 is a bottom view of a top plate for a tape data cartridge embodying the invention.

Referring now to FIG. 6, there is shown a bottom perspective view of the top plate 12 which may be formed of plastic material such as polycarbonate to promote compatibility with the baseplate material relative to thermal expansion coefficients and to facilitate ultrasonic or adhesive attachment thereof to the top edges of the walls of the baseplate 30. The edge-oriented protrusions 60 provide edge rigidity. Such protrusions also serve as dams to retain adhesive in place and provide greater adhering surface attachment of the top plate 12 to the walls of the baseplate 30. For ultrasonic bonding of the top plate 12 to the walls of the baseplate 30, a triangular-shaped protrusion 61 is formed substantially about the perimeter of the top plate 12 near the periphery thereof to promote good contact between the top plate and the sidewalls of the baseplate 30 and thereby concentrate the ultrasonic energy in forming a continuous bond. One or more pin-receiving bosses 64 with apertures or blind holes 27 therein are disposed to frictionally receive therein the top ends of one or more of the pins 45 that support the drive roller 47, and optionally the tape hubs 49, and optionally the belt rollers 51. In this manner, lateral forces applied, for example, to the perimeter of drive roller 47 can be transferred via the supporting pin 45 to the top plate 12 and to the baseplate 30 which thus retains such pin at both ends thereof in vertical orientation relative to the baseplate 30. The elastomeric elements 56 may be adhered to the top plate 12 in proper registration over the tape hubs 49 and about the upper end of the associated pins 45, or a metal leaf spring may be attached to the top plate 12 with ends in registration over the tape hubs 49, to provide light resilient force against the tape hubs when the cartridge is assembled. .

Figure 7:
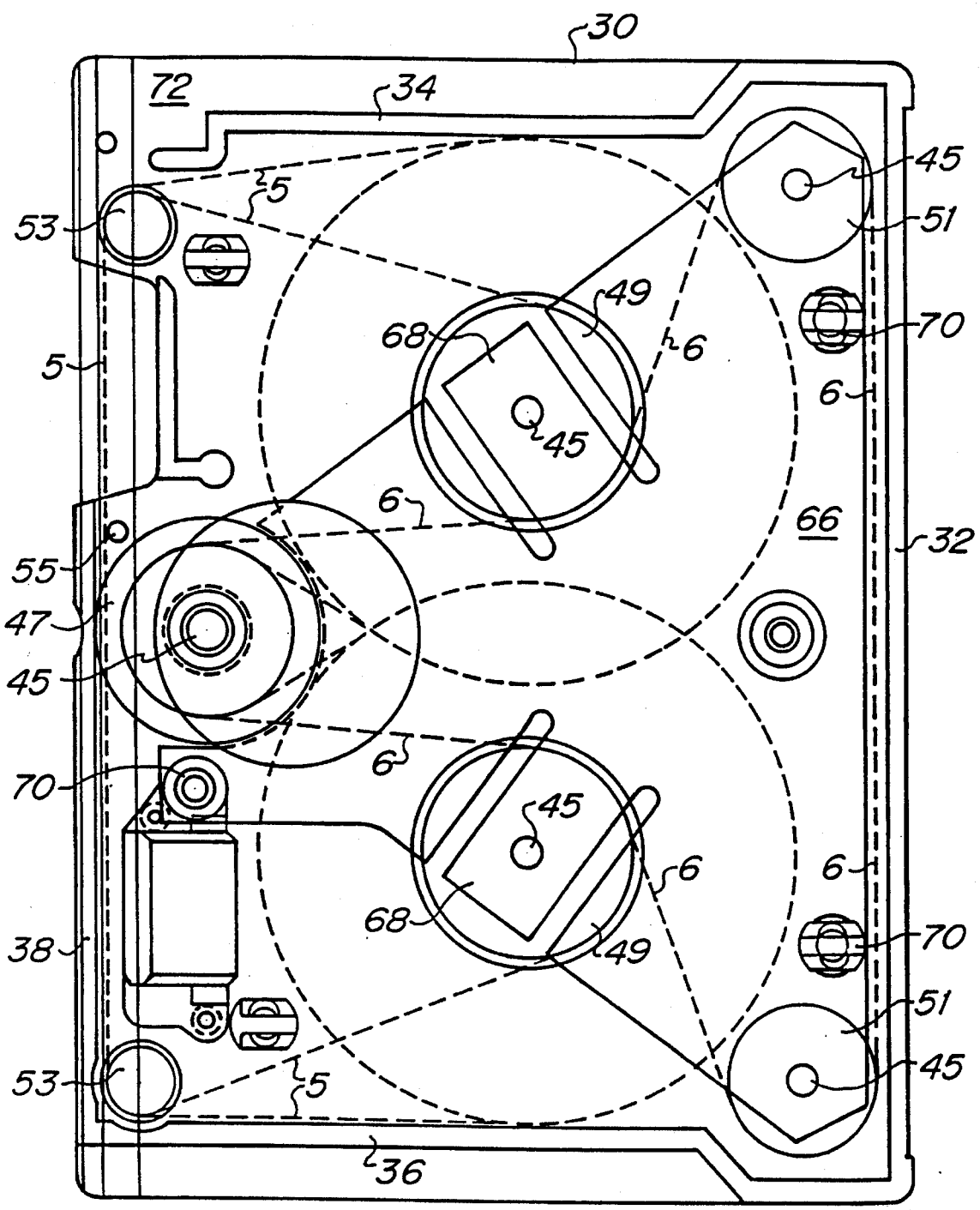
FIG. 7 is a top view of an alternative embodiment of a tape date cartridge showing a top plate according to an of the present invention.

Referring now to FIG. 7, there is shown a top view of an alternative embodiment of a tape data cartridge including a top support plate 66 according to the present invention in which the upper ends of all support pins 45 for rollers and hubs for the drive belt and tape are received in and supported by the top support plate 66. In addition, resilient bias in the axial direction against the tape hubs may be provided by leaf springs 68 integrally formed in the top support plate 66 which is rigidly mounted at spaced elevation above the baseplate 30 via fasteners 70. In this embodiment of the invention, lateral forces exerted on the support pins 45 are transferred via both ends of such pins to the top support plate 66 as well as to the baseplate 30 via fasteners 70 rather than via sidewalls 32, 34, 36, and 38. A top cover 72 overlays the top support plate 66 for attachment to side walls of the baseplate 30. In either embodiment, the top plate 12 or top cover 72 includes a write-protect device 18 as illustrated in FIGS. 1(a) and 2 which may be retained in place by one or more integral peg(s) (not shown) that frictionally engage the device 18 to retain it in place. When selected by a user of the tape data cartridge, the device may be pried off the peg(s) to provide write protection in conventional manner for data on the tape 5 within the cartridge 10.

Figure 8A:
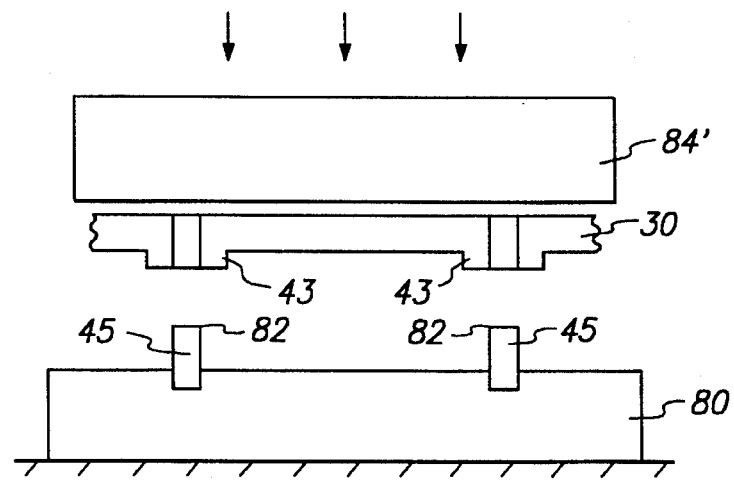
FIGS. 8 (a), 8 (b) and 8 (c) are schematic illustrations of the steps of pin insertion into a baseplate according to the present invention.
Figure 8B:
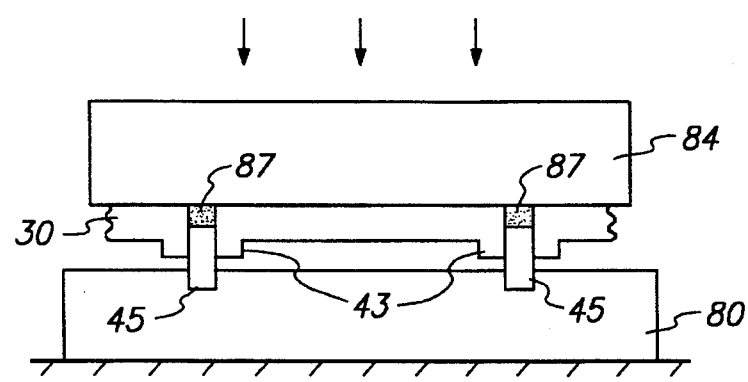
Figure 8C:
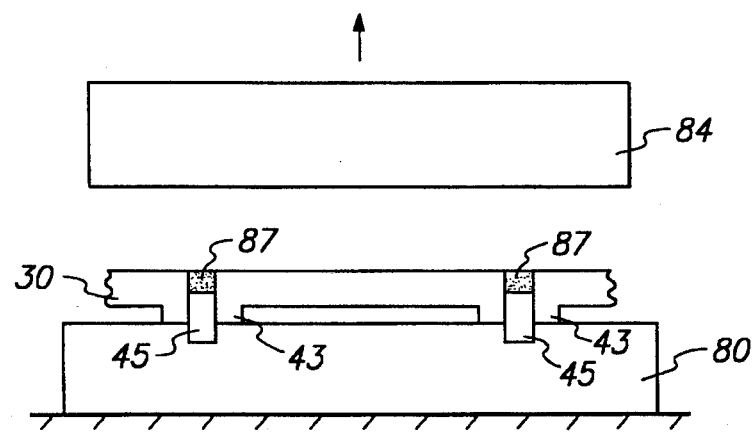
Figure 9A:
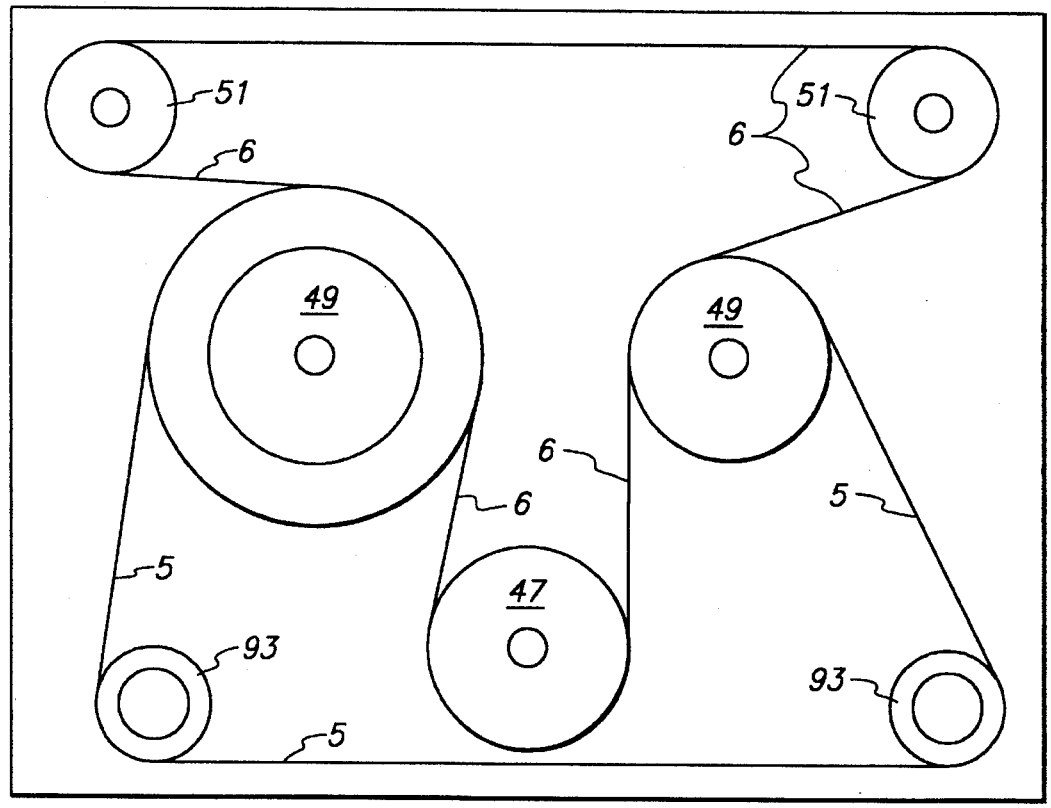
FIGS. 9(a) through 9(d) are schematic illustrations of the steps of loading tape hubs and rollers and drive belt and tape onto receiving pins and guides of a baseplate according to the present invention.
Figure 9B:
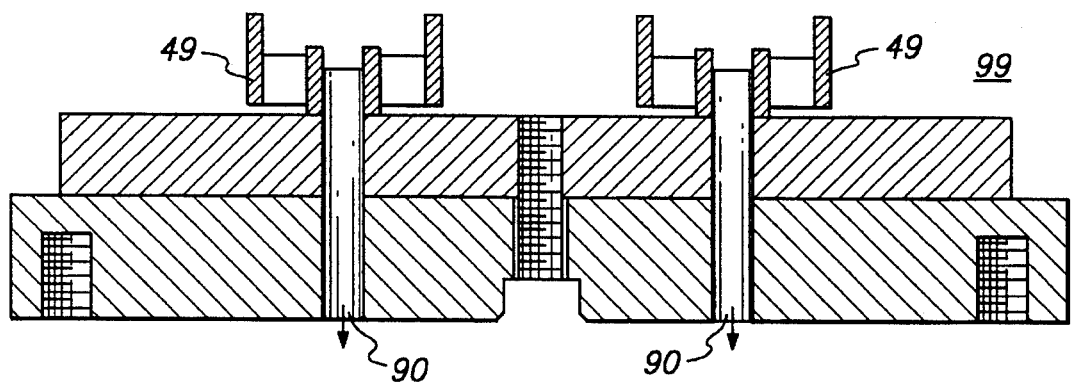
Figure 9C:
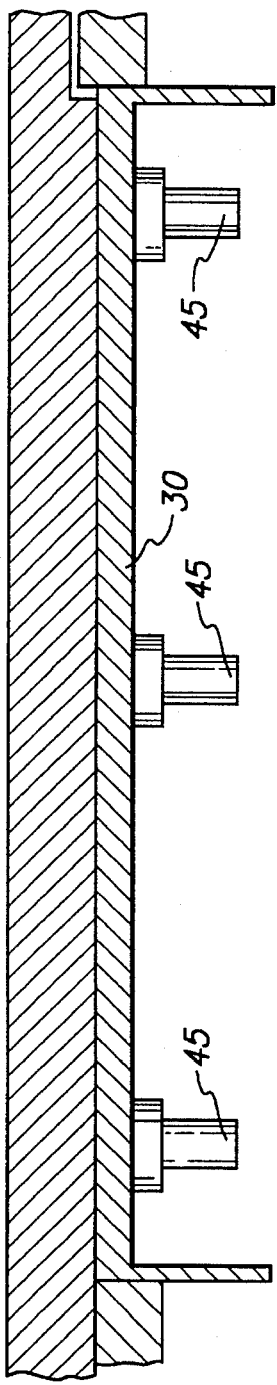
Figure 9D:
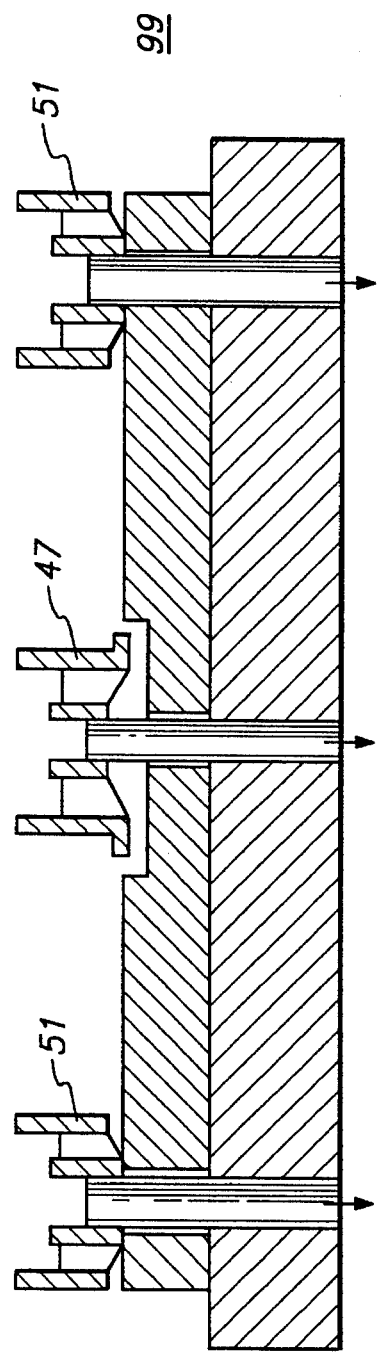

Referring now to FIG. 8(a)–(c), there are shown pictorial illustrations of the sequence of steps by which the pins 45 are rigidly mounted within the raised bosses 43 that are integrally formed in the baseplate 30. Specifically, the pins 45 are mounted in a fixture 80 which holds the pins 45 in proper orientation, elevation, and vertical alignment to mate with the apertured bosses 43 in the baseplate 30. Additionally, midguide pin 55 and tape guides 53 may also be mounted in the fixture 80 for assembly at this step of the process. Thereafter, the baseplate 30 is urged into engagement with the leading edges 82 of the pins, and is ultrasonically agitated into position on the pins 45 via an ultrasonic energy source coupled in conventional manner to the supporting horn or chuck 84. The leading edges 82 of the pins 45 may include sharp shoulders or knurled surfaces (or flat recesses, as illustrated in FIG. 2) with the outer diameter of the leading edges of the pins 45 being slightly larger than the inner diameter of the apertured bosses 43. The application of ultrasonic energy to the baseplate 30 plasticizes the boss material at least about the pins due to the ultrasonic heating of the material, and excess material 87 is carried forward into the aperture in the bosses 43 to fill the aperture and form a floor therein to further support the pins 45. Thereafter, ultrasonic energy ceases to be supplied to the horn or chuck 84, and the material of the baseplate returns to its original set condition, rigidly holding the pins 45 in positions within the integral bosses 43 for removal as a unified assembly from the fixture 80.

Referring now to FIG. 9(a)–(d), there are shown pictorial representations of the sequence of assembly steps used to load a length of tape and drive belt and associated rollers and hubs onto the pins 45 in the unified baseplate assembly 30. These steps greatly facilitate the assembly of the finished cartridge over the obstacles of sidewalls that inhibit winding a length of tape onto assembled, rotatable hubs which might otherwise be positioned on the baseplate 30 for convenient coiling thereon of a length of tape. Therefore, tape hubs 49 are positioned upside down on transfer pins 90 and a length of tape 5 is wound or coiled on the tape hubs 49 and positioned over a path of tape travel from one hub 49, over a corner tape-guide 53, to another corner tape-guide 53, and then to the other hub 49, all in upside down orientation. In addition, the resilient drive belt 6 is assembled along the belt path around a drive roller 47, along the peripheries of the rolls of tape on the tape hubs 49, and around the corner rollers 51, all in upside-down orientation. The transfer pins 90 are resiliently retained in a fixture 99 to retract against the axial force applied thereto by the pins 45 and pegs 46 of the baseplate 30 with which they align. Therefore, as the baseplate assembly 30 is positioned over the fixture 99, now loaded upside down with tape, belt, rollers, tape guides, and hubs, and pressed into position, the transfer pins retract out of the way as the mating pins and pegs of the baseplate advance into final position. Thus, the assembled components are thereby transferred to the baseplate assembly 30 in right-side up orientation thereon, and the fixture 99 may be removed leaving the tape, drive belt, hubs, tape guides, and rollers fully assembled on the baseplate 30 with the periphery of the drive roller 47 partially protruding through the upper aperture 44 in front wall 38. The tape path as assembled within the cartridge therefore passes from a coil of tape on one tape hub 49, around corner tape guide 53, through the recess 16 in the front wall 38, past the midguide pin 55, past the drive roller 47 (without contact), around the tape guide 53 in the opposite corner, to the coil of tape on the other tape hub 49. The path of the drive belt 6 is assembled around the drive roller 47, along the peripheries of coils of tape on the tape hubs 49 and around the rollers 51 in the rear corners of the cartridge. Thereafter, the prism 42 with window 24 supported thereon may be ultrasonically welded or adhesively attached to the baseplate 30 over the window 52. The spring-biased, pivoted door 20 may be mounted with spring 17 on pivot pin 20 to provide protection and controlled access to the tape 5 within the recess 16 in the front wall 38. Then the top plate 12 may be assembled by press-fitting the top plate with one or more apertures 27 or recesses therein over the upper ends of one or more of the aligned pins 45, and may be rigidly attached to the side walls 32, 34, 36 and 38 in conventional manner using ultrasonic welding or adhesive along the mating peripheries of the top plate 12 and top edges of the side walls 32, 34, 36, 38 to complete the tape data cartridge according to the present invention. Optical signals may pass through prism 42 to be reflected thereby through apertures located near the beginning and end of the length of tape 5, and through window 24 positioned in the aperture 40 in the front wall 38. In accordance with the present invention, tape 5 of varying widths (e.g. ¼" or 8 mm) may be accommodated within substantially the same cartridge design merely by altering the elevations of the reference surfaces of the associated integral bosses relative to the datum or reference surface of the baseplate 30.

Figure 10:
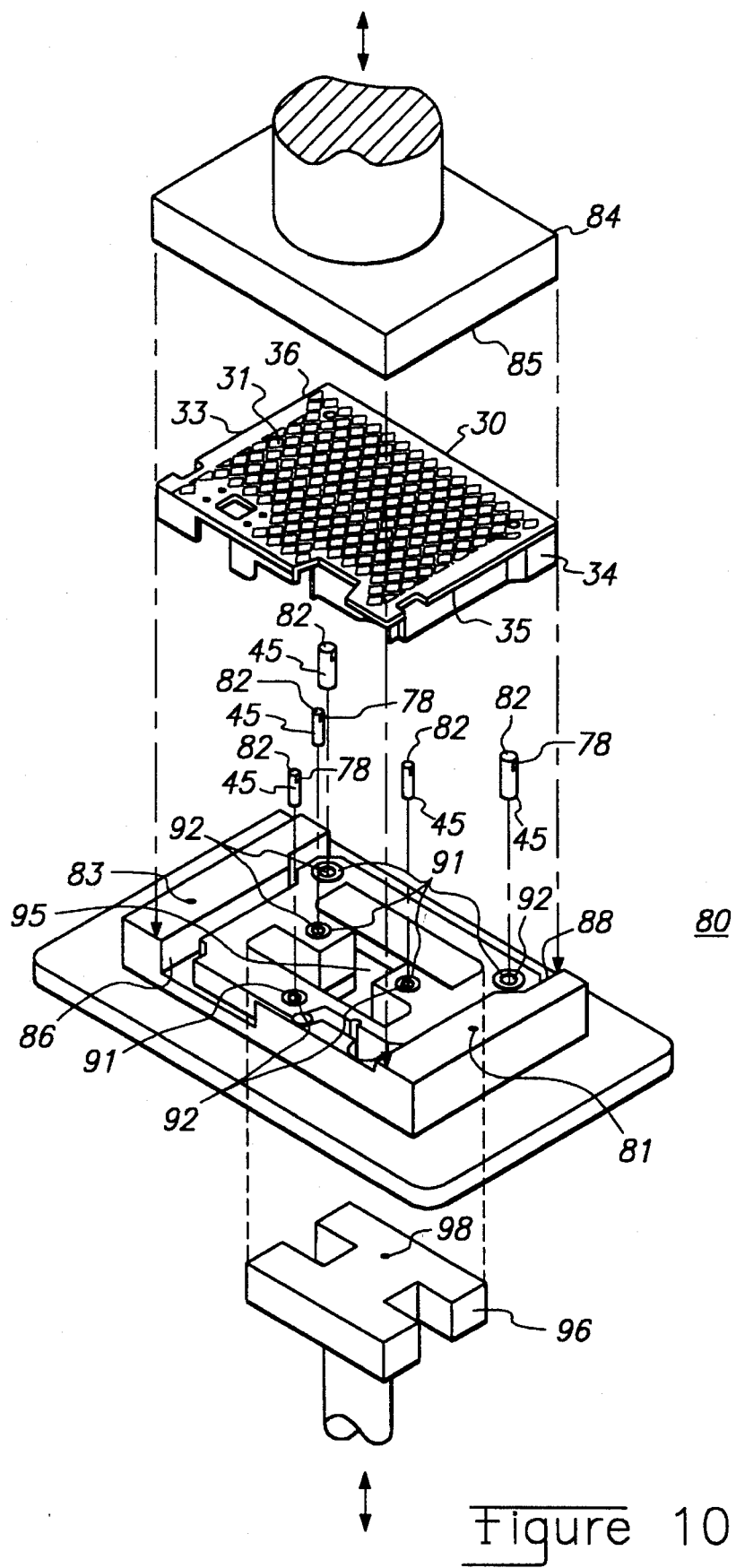
FIG. 10 is an exploded, perspective view illustrating the ultrasonic assembly fixture with pins and baseplate in proper orientation.
Figure 11:
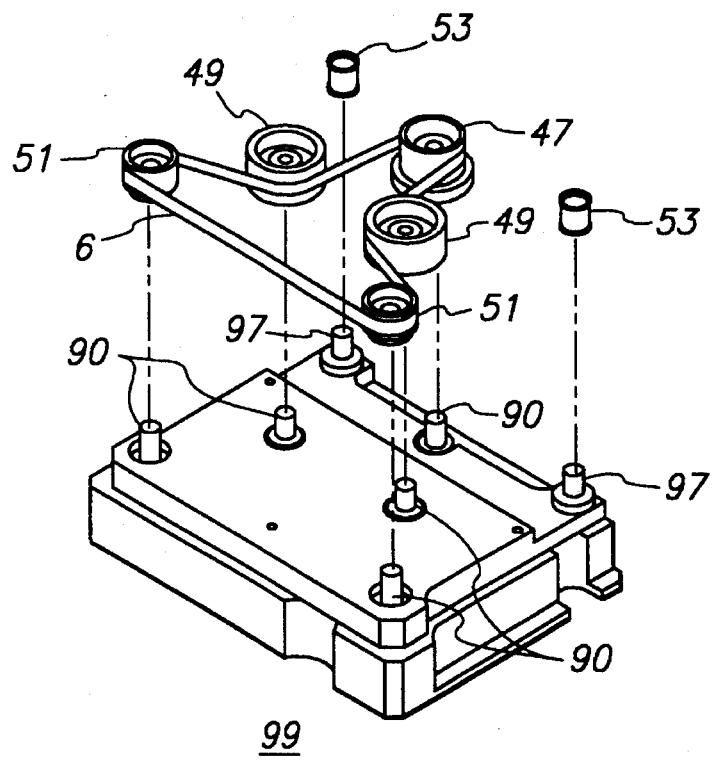
FIG. 11 is an exploded, perspective view of rotational components and tape guides assembled in inverted orientation on transfer pins.

More specifically now with reference to FIG. 10, there is shown a perspective view of an assembly operation in which the baseplate 30 is positioned for ultrasonic actuation onto an array of cylindrical pins 45. The ultrasonic horn or chuck 84 is coupled to a conventional ultrasonic transducer which is energized in convention manner by an electrical signal in the ultrasonic frequency range (typically about 20 kilohertz), and which is disposed with its planar front face 85 to engage the planar back surface 31 of a baseplate 30. The baseplate 30 includes laterally-spaced reference surfaces 33, 35 which are oriented within plane-parallel relationship and critical dimensional tolerances relative to the planar surface 31 of the baseplate 30, and which are positioned to contact the corresponding reference surfaces 81, 83 of the assembly fixture 80. The reference surfaces 81, 83 of the assembly fixture are thus disposed in substantially plane-parallel relationship, within extremely close tolerances, to the front face 85 of the ultrasonic horn or chuck 84.

The assembly fixture 80 includes a series of referencing edges 86, 88 for properly positioning a baseplate 30 thereon, and includes a plurality of bushings 91 that are oriented relative to a baseplate 30 located on the fixture 80 to retain pins 45 therein at precise positions for insertion into the baseplate 30, as later described in detail herein. Each bushing 91 is disposed to retain in slideable engagement therein an insertable pin 45 having a diameter, for example, of about 0.1251 inches for a bore 92 within the bushing 91 of about 0.1256 inches diameter. The depth within the bore 92 of a bushing 91 to which a pin 45 may be inserted is limited by a conventional stop mechanism (not shown) such as an inward flange or shoulder, or an axial set screw, or the like. Thus, a pin 45 positioned within the bore 92 of a bushing 91 is retained perpendicular to the reference surfaces 81, 83 to a tolerance of within 1 degree, and typically within 30 minutes, of angular deviation. The assembly fixture 80 includes an aperture 95, for example, in the shape of an "H", or multiple cylindrical apertures, or other suitably-shaped apertures that are substantially perpendicularly oriented with respect to the reference surfaces 81, 83 in order to accommodate an ejector (or ejectors) 96 passing therethrough to elevate a baseplate 30 up and out of the assembly fixture 80, as later described herein.

In operation, the bores 92 of the bushings 91 in the assembly fixture 80 are each fitted with an insertable pin 45 in close sliding tolerance therein. Each pin 45 includes an exposed or leading end 82 that includes a key mechanism against rotation (in the baseplate 30 when inserted therein) such as one or more flats 78 on the cylindrical surface of each pin 45 near the exposed or insertion end thereof. In addition, each pin 45 also includes surface anomalies such as ridges or grooves, or the like, to inhibit axial withdrawal from the baseplate 30, once inserted therein. The pins 45 thus slidably positioned in the assembly fixture 80, with the exposed or insertion ends thereof having surface anomalies, as illustrated in FIGS. 2 and 10, and extending a selected distance relative to the reference surfaces 81, 83 of the assembly fixture 80, are therefore ready for precision insertion into a baseplate 30.

A baseplate 30 includes a plurality of integrally-formed raised bosses 43 with upper reference surfaces 41 thereof oriented at precise elevations relative to the planar face 31 and to the laterally-spaced reference surfaces 33, 35. Each such boss includes a bore hole 39 therein and is located on the baseplate 30 about the position of a corresponding pin 45 that is positioned in alignment therewith in the assembly fixture 80. The integrally-formed boss 43 also includes a recess or surface depression 37 in the upper surface thereof about the bore hole 39 therein, as illustrated in FIG. 2, for the purpose of retaining any plastic slag or rubble (attributable to the pin-insertion process) below the upper reference surface 41 of the boss 43, and therefore out of contact with any component 47, 49, 51 mounted for rotation about the inserted pin 45.

As illustrated in FIG. 10, a baseplate 30 is positioned on the assembly fixture 80 beneath the ultrasonic horn or chuck 84 and above the pins 45 that are positioned in the assembly fixture 80, with the sidewalls 34, 36 of the baseplate 30 in sliding contact with the reference edges 86, 88 of the assembly fixture 80 to assure proper positioning of the baseplate 30 as the pins 45 are inserted therein. Relative motion of the ultrasonic horn or chuck 84 and assembly fixture 80 thus engages the exposed ends of the pins 45 with the corresponding bore holes 39 in bosses 43 on the inner surface of the baseplate 30. Additional relative motion in the same direction, with ultrasonic energy applied to the horn or chuck 84, thus couples ultrasonic energy through the baseplate 30 to the pins 45 held in static position in assembly fixture 80 to thereby plasticize or otherwise soften the plastic material of the baseplate 30 in known manner as the pins are retained in precise position and perpendicularly relative to the reference surfaces 81, 83 of the assembly fixture 80. Such relative motion proceeds with the exertion of only light force sufficient to urge the pins 45 to penetrate the corresponding bore hole 39 of a boss 43 in the baseplate 30. The insertable end of each pin 45 protrudes from the associated bore 92 sufficient to penetrate the corresponding boss 43 of the baseplate 30 by approximately 1.5 diameters of the pin. Such relative motion ceases when the planar face 85 of ultrasonic horn or chuck 84 is spaced from the reference surfaces 81, 83 of the assembly fixture 80 only by the thickness of the baseplate 30 between the back surface 31 and laterally-spaced reference surfaces 33, 35 thereof. The application of ultrasonic energy to the horn or chuck 84 is terminated, and the plastic material in the bosses 43 of the baseplate 30 that was plasticized or otherwise softened by the application of ultrasonic energy thus solidifies about the ends of the pins 45 while being held in precise position and perpendicular orientation, typically to within 30 minutes of angular deviation, within the assembly fixture 80 relative to the reference edges 86, 88 and surfaces 81, 83 thereon. The ultrasonic horn or chuck 84 is then retracted away from the baseplate 30. Thereafter, the baseplate 30, with the pins 45 rigidly positioned therein, is removed from the assembly fixture 80. The baseplate 30 rigidly retains all of the pins 45 therein with the positional and perpendicular precision with which the pins 45 were positioned within the assembly fixture 80. Removal of the baseplate 30 with attached pins 45 from the assembly fixture 80 thus requires precise movement of the baseplate assembly relative to the assembly fixture 80 to assure that the precise positioning and perpendicularity of the pins 45 in the baseplate 30 is not altered. Accordingly, the ejector or ejectors 96 which are normally disposed beneath the upper level or levels of the bushings 91 during the ultrasonic insertion of the pins 45 into bosses 43 of the baseplate 30, can now be elevated or otherwise relatively moved upwardly through the aperture or apertures 95. This upward movement of the ejector 96 is constrained to be in precise alignment with the commonly-aligned axes of all of the inserted pins 45 in order to contact the underside or inside surface 29 of the baseplate 30 in substantially plane-parallel orientation of the contact surface or surfaces 98 of the ejector 96 relative to the plane of the reference surfaces 33, 35. Of course, a plurality of pins, all having upper ends oriented within a plane that is plane-parallel to the plane or the reference surfaces 33, 35, may be elevated within substantially cylindrical apertures 95 to eject the baseplate 30 and attached pins 45 along the axis of the aligned pins 45. In this way, the assembled baseplate 30 cannot be skewed or cantered within the assembly fixture 80 and is ejected therefrom with each of the pins 45 sliding out of the bore holes 92 in the bushings 91 in the assembly fixture 80 to yield a baseplate 30 having pins 45 rigidly inserted therein with a precision of perpendicularity thereof relative to the plane of the reference surfaces 33, 35 that is typically within 30 minutes of angular deviation.

It should be noted with reference to FIG. 2 that any plastic slag or rubble material which is ejected from the bore hole 39 during the ultrasonic insertion therein of a pin 45 is retained within the recess 37 well below the upper reference surface 42 of the boss 43. Also, it should be noted that the diameter of the bore hole 39 is typically smaller than the outer diameter of the pin 45 inserted therein, and that the plastic material forming the walls of the bore hole 39 is displaced ahead of the inserted pin 45 to accumulate 87 within the bore hole ahead of the pin, as shown in FIG. 8B. Such accumulated, displaced plastic material 87 solidifies after the application of ultrasonic energy terminates, and thereby seals the bore hole 39 between the end of the pin 45 and the back side reference surface 31 of the baseplate 30. The baseplate with pins rigidly inserted therein in the manner described is thus ready for rotational components to be assembled on each of the inserted pins 45.

More specifically, with reference to FIGS. 11 through 14, the rotatable drive-belt rollers 51, the drive roller 47, and the tape hubs 49 are assembled on respective transfer pins 90 in inverted orientation on the assembly fixture 99. It should be noted that the transfer pins 90 are mounted within assembly fixture 99 at the precise positional orientations of the corresponding pins 45 inserted within a baseplate 30, and that such transfer pins 90 are both rotationally and translationally movable within the assembly fixture 99, with the transfer pins 90 resiliently biased in the protruding direction, as shown. The rotational components including the drive roller 47, the belt rollers 51, and the tape hubs 49 thus mounted on the transfer pins 90 are therefore fully operational and can be rotated in response to a capstan shaft or other rotatable element (not shown) engaged with the periphery of the drive roller 47 to rotate the drive roller 47. The belt rollers 51, and the tape hubs 49 thus rotate in response to rotation of the drive roller 47 and the movement of the associated resilient belt 6 that is tensioned about the rotational components. The tape guides 53 are also mounted on transfer pins 97 which are mounted for translational movement (but not necessarily rotational motion) within the assembly fixture 99.

A continuous length of recording tape 5, typically about 200 to 300 feet, is then initially prepared for winding onto a tape hub 49, for example, by punching optical sensing holes at selected spacings along the tape relative to the end of the tape. The drive roller 47 is then rotated in one direction to move the belt 6 and thereby rotate the rollers 51 and the tape hubs 49 to wind the length of tape 5 onto one of the hubs 49, with the belt 6 always in contact with the perimeter of the coil of tape that assembles on the hub 49. As the rotatable components are thus rotated to coil a length of tape 5 onto the hub 49, the associated transfer pins 90 are free to rotate within the assembly fixture 99 to diminish the possibilities of damage to the bearing surfaces in such rotatable components. After the full length of tape 5 is thus almost completely wound onto the tape hub 49, the remaining end of the tape 5 is prepared, for example, by punching a series of optical sensing holes therethrough at selected locations relative to the end of the tape 5. The pair of tape guides 53 have identical flanges at opposite ends thereof in a spool-like configuration and are positioned (in either end-for-end orientation) on transfer pins 97. The prepared end of the tape is then positioned along a path about the tape guides 53, with the recording surface disposed away from the tape guides 53, to the remaining tape hub 49 where the tape end is positioned for take up on the hub 49. A few rotations of the drive roller 47 in the opposite direction, thus captures the remaining end of the tape 5 on the hub 49 with a few additional laps or convolutes to form a small coil of tape thereon. The entire assembly is thus fully operational on the assembly fixture 99 with the drive belt 6 and tape 5, in tension along their respective paths of movement, all ready for transfer to a baseplate 30.

Figure 12:
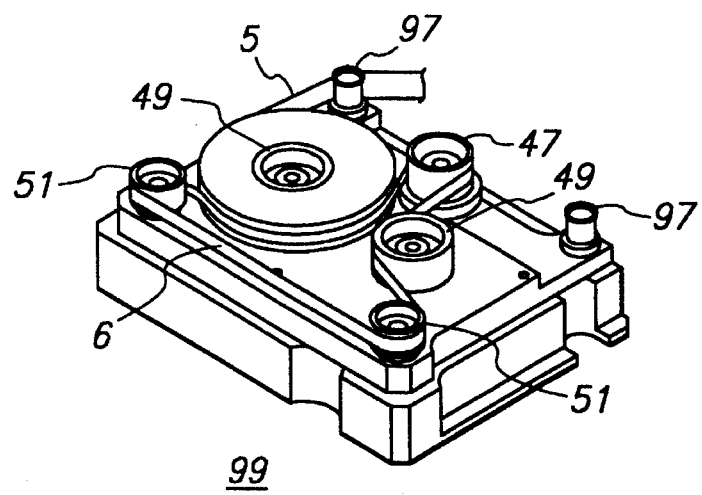
FIG. 12 is a perspective view of cartridge components assembled in inverted orientation on an assembly fixture.
Figure 13:
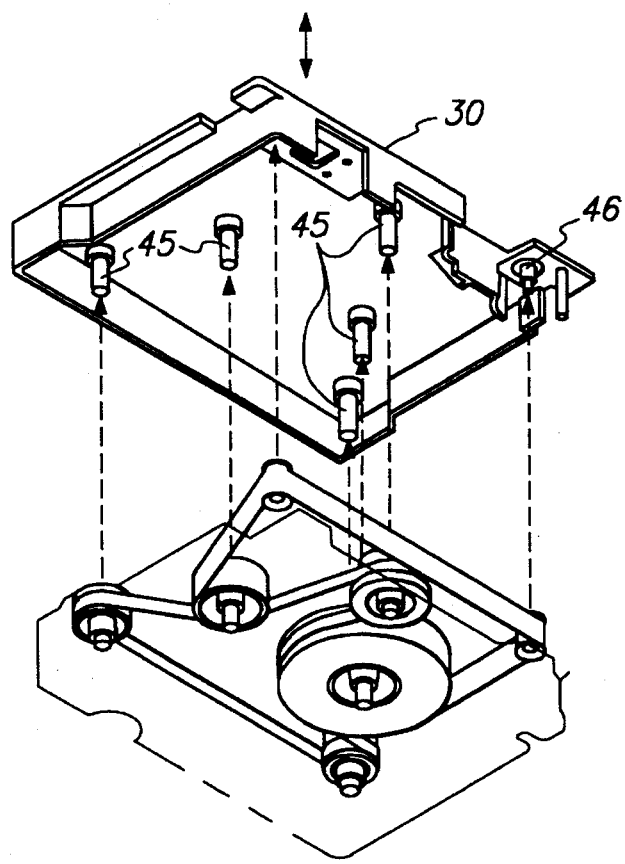
FIG. 13 is an exploded, underside perspective view of the assembly fixture with operating components assembled thereon in inverted orientation for transfer to aligned pins and pegs of a baseplate.
Figure 14:
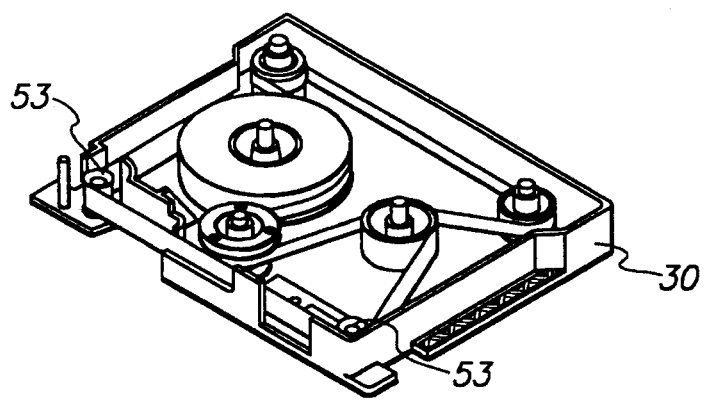
FIG. 14 is a perspective view of the transferred components operatively assembled on a baseplate.

As shown in FIGS. 12 and 13, the assembly fixture 99 and a baseplate 30 are aligned, with the pins 45 of the baseplate 30 in exact axial alignment with the transfer pins 90 of the assembly fixture 99. Relative movement between these elements brings the pins 45 of the baseplate 30 into end contact with the transfer pins 90, and further movement in the same direction displaces the resiliently-biased transfer pins 90 into the assembly fixture 99 and simultaneously positions the pins 45 of the baseplate 30 within the bearing surfaces of the rotational components 47, 49, and 51. In addition, the integrally-formed plastic pegs 46 in the forward corners of the baseplate 30 also displace the associated transfer pins 97 within the tape guides 53. Upon completed relative movement of the baseplate 30 toward the assembly fixture 99, all of the transfer pins 90 are displaced into the fixture 99, and all of the rotational components and tape guides are supported on the respective pins 45 and pegs 46 of the baseplate 30 in upright, operational orientation. The baseplate 30 with all components assembled thereon may now be withdrawn away from the assembly fixture 99 with all of the components retained in place on respective pins 45 and pegs 46 by the belt 6 and tape 5 in tension, as illustrated in FIG. 14.

Figure 15:
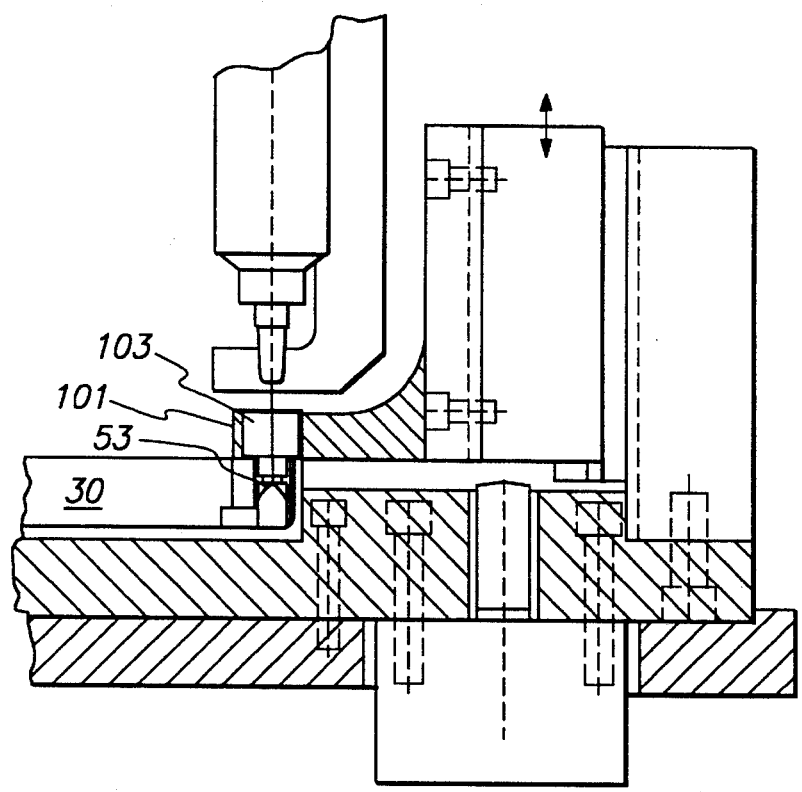
FIG. 15 is a partial side sectional view of an assembly fixture for adhering the tape guides to the associated pegs of a baseplate.

With reference now to FIG. 15, there is shown a partial side sectional view of the assembly apparatus used to attach the assembled tape guides 53 onto the associated pegs 46 on the baseplate 30. Specifically, there is shown a pressure foot 101 having a central aperture 103 therein for pressing down upon the assembled tape guide 53 in the direction toward the baseplate 30 in order to assure proper position and perpendicularity of the bottom-oriented flange of the tape guide 53 on the reference surface of its associated boss in the baseplate 30. The baseplate 30 is supported on and retained in proper position on an assembly fixture 105 that also supports the pressure foot 101 for vertically-oriented translational motion, as illustrated. While the tape guide 53 is held in this position on a baseplate 30, a measured quantity of ultraviolet-curable adhesive (e.g., UV 376 or 399 adhesive commercially available from Loctite) is dispensed into the central bore of the tape guide 53 and about the associated peg 46, and is immediately irradiated with ultraviolet radiation (UV) to cure the adhesive in conventional manner (for example, via optical fibers arranged to couple ultraviolet light to the adhesive from a UV light source, not shown). Pressure exerted on the tape guide against the reference surface of the associated boss also assures adequate seal against migration of the fluid adhesive until it is solidified upon UV curing.

Figure 16:
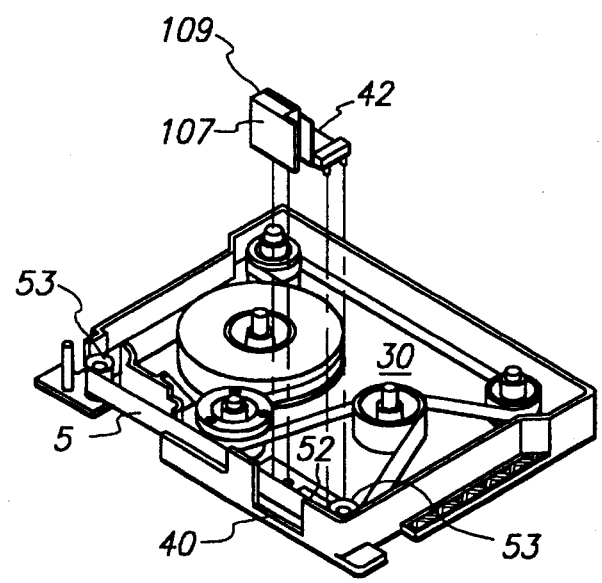
FIG. 16 is an exploded, perspective view of an optical component positioned for attachment to the baseplate.

With all operating components completely assembled within a baseplate, as described above, an optical prism 42 may be assembled within the baseplate 30 near the path of the tape 5 along the forward edge of the baseplate 30. An optical prism 42 such as a corner-cube deflector may be positioned over the window 52 through the baseplate 30, as illustrated in FIG. 16, and affixed in place thereon in conventional manner, for example, by ultrasonic welding or adhesive. In addition, such optical prism 42, for example, as disclosed in the aforementioned Related Applications, may incorporate a window element 107 which is spaced away from the prism for positioning on the opposite side of the tape path within the aperture 40 in the forward edge of the baseplate 30, and which is supported on the prism via a bridging element 109 that traverses the tape path. Accordingly, such optical element is conveniently assembled in, and attached to the baseplate 30 after the tape 5 is installed in operating orientation along the tape path between the tape guides 53. Additionally, resilient bias 68 may be installed in the axial direction against the tape hubs 49, as illustrated in FIG. 7, to limit axial end play and optionally to control frictional drag. Also, the spring-biased pivoted door 20 may be assembled on pivot pin 19 in conventional manner, as illustrated in FIG. 2. Thereafter, the top plate 12 (which optionally may carry elastomeric or metal spring oriented to provide resilient axial bias 56 for the tape hubs 49, as illustrated in FIGS. 2 and 6) is then rigidly adhered via ultrasonic welding or adhesive about substantially the entire periphery thereof to the upper edges of the sidewalls 32, 34, 36, 38 of the baseplate 30 to complete the assembly of the data tape cartridge for final testing in conventional manner.

Therefore, the tape data cartridge designed and assembled according to the present invention greatly reduces total cost of manufacture to provide a rigid tape storage medium that fully complies with standard specifications for tape data cartridges.

What is claimed is:

1. A composite part for a tape cartridge for operation with a single drive capstan, the composite part comprising:

a baseplate of polymeric material having an external surface forming a reference plane and including a plurality of bosses integrally formed at selected locations thereon for supporting pins therein in perpendicular orientation relative to the reference plane, each of the bosses having a reference surface thereof disposed at a selected elevation relative to the reference plane;

a plurality of sidewalls integrally formed on said baseplate near perimeter boundaries along side edges and rear and forward edges thereof, one of said sidewalls on a forward edge of the baseplate including an aperture therein and including a recess in said sidewall on the forward edge adjacent the aperture for receiving a tape transducer therein in operative engagement with a length of tape within the cartridge;

a plurality of pins each disposed within boss for supporting a rotatable element thereon at an elevation relative to reference plane determined by the reference surface of the boss, each of said bosses including a recess in the reference surface thereof about the associated pin for retaining anomalous material therein below the reference surface; and a pair of mounting pegs integrally formed on said baseplate near opposite corners formed by said forward sidewall and opposite sidewalls for supporting tape guides thereon at selected elevations relative to said reference plane:

a drive roller rotatably carried on a first one of the plurality of pins that is disposed in a boss adjacent to said aperture and having a periphery disposed to protrude through said aperture for operatively engaging a drive mechanism to rotate the drive roller on the first pin;

a pair of tape guides rigidly attached to the mounting pegs in perpendicular orientation and selected elevation relative to the reference plane;

a pair of hubs rotatably mounted on second and third ones of the plurality of pins disposed in bosses positioned intermediate the sidewalls for selectively coiling a length of tape thereon which traverses a path from one hub, around one of the pair of tape guides, past said recess, around another of the pair of tape guides, to the other of said hubs;

a pair of belt rollers rotatably disposed on fourth and fifth ones of the plurality of pins in bosses positioned near corners of sidewalls remote from the tape guides for supporting a continuous drive belt thereon along a path which traverses the drive roller, the pair of belt rollers, and contacts the perimeter of each coil of tape on a hub; and an optical element including a light deflector and an optical window supported thereon in spaced relationship, and being attached to the baseplate with the light deflector and the optical window disposed on opposite sides of a length of tape positioned along said path between the pair of tape guides for selectively directing optical signals along an optical path that includes the deflector, the window, and the tape.

2. A composite part for a tape cartridge for operation with a single drive capstan, the composite part comprising:

a baseplate of polymeric material having an external surface forming a reference plane and including a plurality of bosses integrally formed at selected locations thereon for supporting pins therein in perpendicular orientation relative to the reference plane, each of the bosses having a reference surface thereof disposed at a selected elevation relative to the reference plane;

a plurality of sidewalls integrally formed on said baseplate near perimeter boundaries along side edges and rear and forward edges thereof, one of said sidewalls on a forward edge of the baseplate including an aperture therein and including a recess in said sidewall on the forward edge adjacent the aperture for receiving a tape transducer therein in operative engagement with a length of tape within the cartridge;

a plurality of pins each disposed within a boss for supporting a rotatable element thereon at an elevation relative to reference plane determined by the reference surface of the boss, each of said bosses including recess in the reference surface thereof about the associated pin for retaining anomalous material therein below the reference surface, each of said bosses includes an internal bore hole therein below the reference surface for supporting a pin therein to a depth of approximately 1.5 diameters of the pin; and a pair of mounting pegs integrally formed on said baseplate near opposite corners formed by said forward sidewall and opposite sidewalls for supporting tape guides thereon at selected elevations relative to said reference plane.

3. A composite part according to claim 2 wherein each said internal bore hole extends to the reference plane of the baseplate for receiving therein polymeric material of the baseplate displaced from the boss in response to insertion therein of one of said plurality of pins.

4. A composite part for a tape cartridge for operation with a single drive capstan, the composite part comprising:

a baseplate of polymeric material having an external surface forming a reference plane and including a plurality of bosses integrally formed at selected locations thereon for supporting pins therein in perpendicular orientation relative to the reference plane, each of the bosses having a reference surface thereof disposed at a selected elevation relative to the reference plane;

a plurality of sidewalls integrally formed on said baseplate near perimeter boundaries along side edges and rear and forward edges thereof, one of said sidewalls on a forward edge of the baseplate including an aperture therein and including a recess in said sidewall on the forward edge adjacent the aperture for receiving a tape transducer therein in operative engagement with a length of tape within the cartridge;

a plurality of pins each disposed within a boss for supporting a rotatable element thereon at an elevation relative to reference plane determined by the reference surface of the boss, each of said plurality of pins being retained in the associated boss of the baseplate in perpendicular orientation relative to the reference plane to within not more than 30 minutes of angular deviation, and each of said bosses including a recess in the reference surface thereof about the associated pin for retaining anomalous material therein below the reference surface; and a pair of mounting pegs integrally formed on said baseplate near opposite corners formed by said forward sidewall and opposite sidewalls for supporting tape guides thereon at selected elevations relative to said reference plane.

5. A light reflecting structure for incorporation into a baseplate of a tape cartridge, said structure comprising:

a prism having a first optical surface for orientation substantially parallel to the plane of the baseplate for passing optical signals therethrough, a second optical surface substantially orthogonally oriented with respect to the first surface for passing optical signals therethrough, and a third reflective surface oriented at a selected angle with respect to the first surface for reflecting optical signals between said first and second surfaces;

an optical window spaced from said prism near the second surface and oriented for passing optical signals therethrough to or from said prism; and a bridge having a first end attached to said prism and a second end attached to said optical window for structurally supporting said window relative to said prism to form a single structure.

6. The light reflecting structure of claim 5, wherein said prism, said window, and said bridge are integrally formed of a transparent plastic material.

7. The light reflecting structure of claim 5, wherein said prism, said window, and said bridge are integrally formed of acrylic plastic material.

8. The light reflecting structure of claim 5, wherein said selected angle is less than 45 degrees, said second surface is oriented at greater than a right angle with respect to said first surface, and said optical window is oriented at less than a right angle with respect to said first surface.

9. The light reflecting structure of claim 5, wherein the selected angle is set to cause optical signals emerging from said optical window to have an optical signal path which is parallel to the first surface of said prism.

* * * * *